(12) United States Patent
Mondal

(10) Patent No.: US 11,354,613 B2
(45) Date of Patent: Jun. 7, 2022

(54) SYSTEM, METHOD, AND COMPUTER PROGRAM PRODUCT FOR GENERATING LOCATION-BASED RISK ASSESSMENTS OF SERVICE PROVIDER TRANSACTION REQUESTS

(71) Applicant: Visa International Service Association, San Francisco, CA (US)

(72) Inventor: Papak Mondal, Singapore (SG)

(73) Assignee: Visa International Service Association, San Francisco, CA (US)

( * ) Notice: Subject to any disclaimer, the term of this patent is extended or adjusted under 35 U.S.C. 154(b) by 192 days.

(21) Appl. No.: 16/150,590

(22) Filed: Oct. 3, 2018

(65) Prior Publication Data

US 2020/0111037 A1    Apr. 9, 2020

(51) Int. Cl.
  *G06Q 10/06*   (2012.01)
  *G06Q 20/40*   (2012.01)
  *H04W 4/02*    (2018.01)

(52) U.S. Cl.
  CPC ..... *G06Q 10/0635* (2013.01); *G06Q 20/4016* (2013.01); *H04W 4/025* (2013.01)

(58) Field of Classification Search
  None
  See application file for complete search history.

(56) References Cited

U.S. PATENT DOCUMENTS

| | | | |
|---|---|---|---|
| 9,560,027 B1 | 1/2017 | Kolman et al. | |
| 10,147,065 B1 * | 12/2018 | Yiftachel | G06Q 30/06 |
| 2004/0236692 A1 * | 11/2004 | Sellen | G06Q 20/108 |
| | | | 705/45 |
| 2004/0249568 A1 * | 12/2004 | Endo | G01C 21/3691 |
| | | | 701/410 |
| 2011/0093188 A1 * | 4/2011 | Barkai | G01C 21/20 |
| | | | 701/532 |
| 2012/0030079 A1 * | 2/2012 | Slater | G06Q 40/08 |
| | | | 705/35 |

(Continued)

FOREIGN PATENT DOCUMENTS

| | | |
|---|---|---|
| CA | 2963847 A1 | 10/2017 |
| GB | 2512340 A | 1/2014 |

OTHER PUBLICATIONS

"Uber applies for patent to spot drunk passengers", BBC News, Jun. 12, 2018, https://www.bbc.com/news/technology-44452259.

*Primary Examiner* — Sujay Koneru
(74) *Attorney, Agent, or Firm* — The Webb Law Firm

(57) ABSTRACT

Described are a system, method, and computer program product for evaluating location-based risk associated with a remote transaction request. The method includes receiving, from a service provider system, a transaction request for a transaction between a user and the service provider system for a requested service, the transaction request identifying at least a location for the requested service. The method also includes generating a risk score for the transaction based at least partially on the transaction request, the location for the requested service, and historical transaction data. The method further includes communicating the risk score for the transaction to the service provider system. Communicating the risk score to the service provider system causes the service provider system to take at least one action based at least partially on the risk score for the transaction.

15 Claims, 7 Drawing Sheets

(56) References Cited

U.S. PATENT DOCUMENTS

| | | | |
|---|---|---|---|
| 2012/0143616 A1* | 6/2012 | Pulak | G06Q 10/087 705/1.1 |
| 2013/0097710 A1* | 4/2013 | Basavapatna | H04L 63/12 726/25 |
| 2013/0166607 A1* | 6/2013 | Turk | G06Q 10/02 707/803 |
| 2013/0198046 A1* | 8/2013 | Hammad | G06Q 30/06 705/30 |
| 2013/0268306 A1* | 10/2013 | Tai | G06Q 10/025 705/6 |
| 2013/0276125 A1* | 10/2013 | Bailey | G06F 21/577 726/25 |
| 2013/0290201 A1* | 10/2013 | Rodriguez Carrillo | G06Q 30/0185 705/318 |
| 2014/0045529 A1* | 2/2014 | Bolon | H04W 4/021 455/456.1 |
| 2014/0172697 A1 | 6/2014 | Ward et al. | |
| 2014/0279556 A1* | 9/2014 | Priebatsch | G06Q 20/38215 705/67 |
| 2015/0081362 A1* | 3/2015 | Chadwick | G06Q 10/06311 705/7.14 |
| 2015/0088739 A1* | 3/2015 | Desai | G06Q 30/0207 705/42 |
| 2015/0142642 A1* | 5/2015 | Suplee | G06Q 40/02 705/39 |
| 2015/0223024 A1* | 8/2015 | Abuodeh | G06Q 10/08 455/456.3 |
| 2015/0269579 A1* | 9/2015 | Subramanian | G06Q 20/0855 705/44 |
| 2015/0278210 A1* | 10/2015 | Novotny | G06F 16/951 707/733 |
| 2016/0132886 A1* | 5/2016 | Burke | G06Q 20/3224 705/44 |
| 2016/0140561 A1* | 5/2016 | Cowan | G06Q 20/20 705/26.35 |
| 2016/0171621 A1* | 6/2016 | Bogovich | G06Q 10/0635 705/4 |
| 2016/0292666 A1* | 10/2016 | Chauhan | G06Q 20/204 |
| 2016/0330601 A1* | 11/2016 | Srivastava | B64C 39/024 |
| 2017/0046706 A1* | 2/2017 | Agarwal | G06Q 20/20 |
| 2017/0053282 A1 | 2/2017 | Olumofin et al. | |
| 2017/0098086 A1* | 4/2017 | Hoernecke | G06Q 10/0635 |
| 2017/0300911 A1* | 10/2017 | Alnajem | G06Q 10/0635 |
| 2017/0316357 A1* | 11/2017 | Meganathan | G06Q 20/4016 |
| 2017/0343360 A1* | 11/2017 | Harikrishnan | G01S 5/0027 |
| 2017/0346776 A1* | 11/2017 | Valla | H04L 67/30 |
| 2018/0080782 A1* | 3/2018 | Noda | G06Q 10/047 |
| 2018/0240128 A1* | 8/2018 | Lu | G06Q 50/30 |
| 2018/0260815 A1* | 9/2018 | Bender | G06Q 20/3224 |
| 2018/0340790 A1* | 11/2018 | Kislovskiy | G01C 21/3484 |
| 2018/0341888 A1* | 11/2018 | Kislovskiy | G08G 1/096838 |
| 2018/0342034 A1* | 11/2018 | Kislovskiy | G06Q 10/06315 |
| 2019/0033084 A1* | 1/2019 | Chen | G01C 21/3423 |
| 2019/0034820 A1* | 1/2019 | Manning | G06N 5/022 |
| 2019/0102689 A1* | 4/2019 | Lassoued | G07C 5/0841 |
| 2019/0244394 A1 | 8/2019 | Gueguen et al. | |
| 2019/0303822 A1* | 10/2019 | Spoon | G06Q 10/0635 |
| 2019/0318358 A1* | 10/2019 | Chamberlain | G06Q 20/3223 |
| 2019/0347666 A1* | 11/2019 | Bermudez-Cisneros | G06Q 20/401 |

* cited by examiner

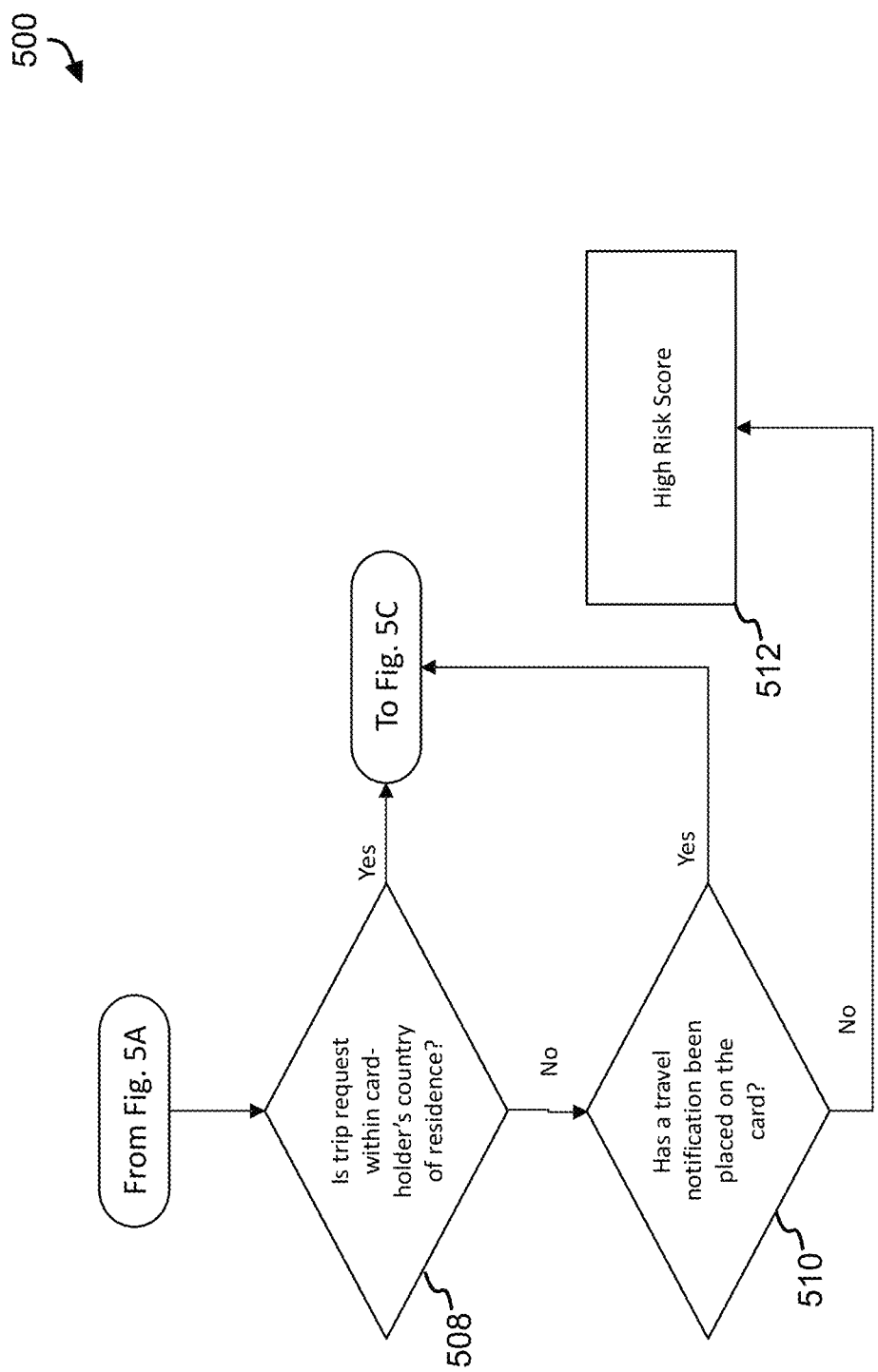

SYSTEM, METHOD, AND COMPUTER PROGRAM PRODUCT FOR GENERATING LOCATION-BASED RISK ASSESSMENTS OF SERVICE PROVIDER TRANSACTION REQUESTS

BACKGROUND OF THE INVENTION

Field of the Invention

Disclosed embodiments relate generally to computer-driven risk prediction and response, and in some non-limiting embodiments, to a system, method, and computer program product for evaluating location-based risk associated with a remote transaction request.

Technical Considerations

There are many service providers who regularly accept remote transaction requests for the performance of services and/or the delivery of goods at locations other than a regular place of business, locations where they have not or have only sporadically performed services in the past, and/or other locations where they are not in control of the environment in which the service is to be performed. Examples of such service providers include operators of vehicles for hire (e.g., taxi cab drivers or ride-share drivers), delivery personnel (e.g., those who deliver food from restaurants or other items for which a customer may pay upon arrival), home repairpersons (e.g., personnel who fix home appliances on site), and professionals who make "house calls" (e.g., social workers, doctors, nurses, lawyers, etc., who perform services for patients/clients in their homes). Such service providers may be exposed to unforeseen personal and/or economic risks at certain service locations. For example, certain locations may be associated with high rates of crime, unsafe conditions, frequent instances of fraudulent service requests, and/or the like.

Existing systems for addressing this issue generally involve the use of customer review programs which may allow a service provider, upon receiving a service request from a potential customer, to examine reviews and/or ratings of that potential customer from other similarly situated service providers (e.g., service providers from the same company or who may be otherwise participating in the same review program) before deciding whether to accept the service request. However, such systems have several technical limitations. For example, such systems rely on the availability of reviews and/or ratings for the potential customer, and, accordingly, are of no use for evaluating the risk associated with providing services for new customers or customers who have not previously been rated/reviewed in a review program to which the service provider has access. Further, such systems are reactive, rather than predictive, being unable to account for new risk-affecting conditions that have arisen after a potential customer or service location was last reviewed or served.

There is a need in the art for an improved system, method, and computer program product for evaluating location-based risk associated with a remote transaction request, which provides a predictive risk evaluation system rather than a reactive risk evaluation system, which reduces or eliminates reliance on outside data such as voluntarily provided customer reviews and/or reliance on historical data that is specific to the customer requesting service, and which may provide effective risk evaluation even in the absence of such data. There is a need in the art for predictive risk evaluation systems which may augment the efficiency and accuracy of computer-driven risk evaluation systems, and which may be continuously and automatically updated in real time to predict the presence of recently emerging hazardous conditions.

SUMMARY OF THE INVENTION

Accordingly, and generally, provided is an improved system, method, and computer program product for generating location-based risk assessments of service provider transaction requests. Preferably, in non-limiting embodiments, provided is an improved system, method, and computer program product for receiving a transaction identifying a location for a requested service. Preferably, in non-limiting embodiments, provided is an improved system, method, and computer program product for generating a risk score for the transaction. Preferably, in non-limiting embodiments, provided is an improved system, method, and computer program product for communicating the risk score to the service provider system, which causes the service provider system to take at least one action based at least partially on the risk score for the transaction.

According to non-limiting embodiments or aspects, provided is a computer-implemented method for generating location-based risk assessments of service provider transaction requests. The method includes receiving, with at least one processor and from a service provider system, at least one transaction request for at least one transaction between at least one user and the service provider system for at least one requested service. The at least one transaction request identifies at least one location for the at least one requested service. The method also includes generating, with at least one processor, at least one risk score for the at least one transaction based at least partially on the at least one transaction request, the at least one location, and historical transaction data. The method further includes communicating, with at least one processor, the at least one risk score for the at least one transaction to the service provider system. Communicating the at least one risk score for the at least one transaction to the service provider system causes the service provider system to take at least one of the following actions based at least partially on the at least one risk score for the transaction: (i) display at least one indication including information corresponding to the at least one risk score on at least one mobile device of at least one service provider personnel, (ii) prioritize or de-prioritize the at least one transaction in a resolution queue of the service provider system, (iii) automatically accept or decline the at least one transaction in a transaction handler of the service provider system, or (iv) any combination thereof.

In further non-limiting embodiments or aspects, generating the at least one risk score may include determining, with at least one processor, at least one range of standard transaction times for the at least one location based on the historical transaction data. Generating the at least one risk score may also include determining, with at least one processor, that at least one time of the at least one transaction falls within the range of standard transaction times. Generating the at least one risk score may further include, in response to determining that the at least one time of the at least one transaction falls within the at least one range of standard transaction times, reducing the at least one risk score or reducing at least one weighted parameter used to generate the at least one risk score.

In further non-limiting embodiments or aspects, generating the at least one risk score may include determining, with at least one processor, that at least one time of the at least one transaction or at least one requested time for the at least one requested service is within at least one predetermined time range of at least one previous transaction. Generating the at least one risk score may also include, in response to determining that the at least one requested time is within the at least one predetermined time range, reducing the at least one risk score or reducing at least one weighted parameter used to generate the at least one risk score.

In further non-limiting embodiments or aspects, the at least one requested service may include transportation from the at least one location to at least one destination. Generating the at least one risk score may include determining, with at least one processor, at least one distance between the at least one location and the at least one destination. Generating the at least one risk score may also include determining, with at least one processor, that the at least one distance satisfies at least one distance threshold. Generating the at least one risk score may further include, in response to determining that the at least one distance satisfies the at least one distance threshold, increasing the at least one risk score or increasing at least one weighted parameter used to generate the at least one risk score.

In further non-limiting embodiments or aspects, the at least one transaction request may include at least one transaction value, at least one transaction time, the at least one location, and historical service request data for the at least one user. The at least one transaction request may include at least one transaction authorization request message in an electronic payment processing system, and the at least one risk score may be communicated to the service provider system in at least one transaction authorization response message. The at least one transaction request may be a plurality of transaction requests for a plurality of transactions. The at least one risk score may be a plurality of risk scores. Communicating the plurality of risk scores to the service provider system may cause the service provider system to, based at least partially on the plurality of risk scores for the plurality of transactions, prioritize or de-prioritize the plurality of transactions in the resolution queue of the service provider system, which may further cause the service provider system to communicatively connect users and service provider personnel in priority order of transactions in the resolution queue.

According to non-limiting embodiments or aspects, provided is a system for generating location-based risk assessments of service provider transaction requests. The system includes at least one processor configured or programmed to receive, from a service provider system, at least one transaction request for at least one transaction between at least one user and the service provider system for at least one requested service. The at least one transaction request identifies at least one location for the requested service. The at least one processor is also configured or programmed to generate at least one risk score for the at least one transaction based at least partially on the at least one transaction request, the at least one location, and historical transaction data. The at least one processor is further configured or programmed to communicate the at least one risk score for the at least one transaction to the service provider system. Communicating the at least one risk score for the at least one transaction to the service provider system causes the service provider system to take at least one of the following actions based at least partially on the at least one risk score for the at least one transaction: (i) display at least one indication including information corresponding to the at least one risk score on at least one mobile device of at least one service provider personnel, (ii) prioritize or de-prioritize the at least one transaction in a resolution queue of the service provider system, (iii) automatically accept or decline the at least one transaction in a transaction handler of the service provider system, or (iv) any combination thereof.

In further non-limiting embodiments or aspects, generating the at least one risk score may include determining, with at least one processor, at least one range of standard transaction times for the at least one location based on the historical transaction data. Generating the at least one risk score may also include determining, with at least one processor, that at least one time of the at least one transaction falls within the range of standard transaction times. Generating the at least one risk score may further include, in response to determining that the at least one time of the at least one transaction falls within the at least one range of standard transaction times, reducing the at least one risk score or reducing at least one weighted parameter used to generate the at least one risk score.

In further non-limiting embodiments or aspects, generating the at least one risk score may include determining, with at least one processor, that at least one time of the at least one transaction or at least one requested time for the at least one requested service is within at least one predetermined time range of at least one previous transaction. Generating the at least one risk score may also include, in response to determining that the at least one requested time is within the at least one predetermined time range, reducing the at least one risk score or reducing at least one weighted parameter used to generate the at least one risk score.

In further non-limiting embodiments or aspects, the at least one requested service may include transportation from the at least one location to at least one destination. Generating the at least one risk score may include determining, with at least one processor, at least one distance between the at least one location and the at least one destination. Generating the at least one risk score may also include determining, with at least one processor, that the at least one distance satisfies at least one distance threshold. Generating the at least one risk score may further include, in response to determining that the at least one distance satisfies the at least one distance threshold, increasing the at least one risk score or increasing at least one weighted parameter used to generate the at least one risk score.

In further non-limiting embodiments or aspects, the at least one transaction request may include at least one transaction value, at least one transaction time, the at least one location, and historical service request data for the at least one user. The at least one transaction request may include at least one transaction authorization request message in an electronic payment processing system, and the at least one processor may be further configured or programmed to communicate the at least one risk score to the service provider system in at least one transaction authorization response message. The at least one transaction request may be a plurality of transaction requests for a plurality of transactions. The at least one risk score may be a plurality of risk scores. Communicating the plurality of risk scores to the service provider system may cause the service provider system to, based at least partially on the plurality of risk scores for the plurality of transactions, prioritize or de-prioritize the plurality of transactions in the resolution queue of the service provider system, which may further cause the service provider system to communicatively connect users and service provider personnel in priority order of transactions in the resolution queue.

According to non-limiting embodiments or aspects, provided is a computer program product for generating location-based risk assessments of service provider transaction requests. The computer program product includes at least one non-transitory machine-readable medium having instructions, which, when executed by at least one processer, cause the at least one processor to receive, from a service provider system, at least one transaction request for at least one transaction between at least one user and the service provider system for at least one requested service. The at least one transaction request identifies at least one location for the at least one requested service. The instructions also cause the at least one processor to generate at least one risk score for the at least one transaction based at least partially on the at least one transaction request, the at least one location, and historical transaction data. The instructions further cause the at least one processor to communicate the at least one risk score for the at least one transaction to the service provider system. Communicating the at least one risk score for the at least one transaction to the service provider system causes the service provider system to take at least one of the following actions based at least partially on the at least one risk score for the at least one transaction: (i) display at least one indication including information corresponding to the at least one risk score on at least one mobile device of at least one service provider personnel, (ii) prioritize or de-prioritize the at least one transaction in a resolution queue of the service provider system, (iii) automatically accept or decline the at least one transaction in a transaction handler of the service provider system, or (iv) any combination thereof.

In further non-limiting embodiments or aspects, generating the at least one risk score may include determining, with at least one processor, at least one range of standard transaction times for the at least one location based on the historical transaction data. Generating the at least one risk score may also include determining, with at least one processor, that at least one time of the at least one transaction falls within the range of standard transaction times. Generating the at least one risk score may further include, in response to determining that the at least one time of the at least one transaction falls within the at least one range of standard transaction times, reducing the at least one risk score or reducing at least one weighted parameter used to generate the at least one risk score.

In further non-limiting embodiments or aspects, generating the at least one risk score may include determining, with at least one processor, that at least one time of the at least one transaction or at least one requested time for the at least one requested service is within at least one predetermined time range of at least one previous transaction. Generating the at least one risk score may also include, in response to determining that the at least one requested time is within the at least one predetermined time range, reducing the at least one risk score or reducing at least one weighted parameter used to generate the at least one risk score.

In further non-limiting embodiments or aspects, the at least one requested service may include transportation from the at least one location to at least one destination. Generating the at least one risk score may include determining, with at least one processor, at least one distance between the at least one location and the at least one destination. Generating the at least one risk score may also include determining, with at least one processor, that the at least one distance satisfies at least one distance threshold. Generating the at least one risk score may further include, in response to determining that the at least one distance satisfies the at least one distance threshold, increasing the at least one risk score or increasing at least one weighted parameter used to generate the at least one risk score.

In further non-limiting embodiments or aspects, the at least one transaction request may include at least one transaction value, at least one transaction time, the at least one location, and historical service request data for the at least one user. The at least one transaction request may include at least one transaction authorization request message in an electronic payment processing system, and the instructions may further cause the at least one processor to communicate the at least one risk score to the service provider system in at least one transaction authorization response message.

In further non-limiting embodiments or aspects, the at least one transaction request may be a plurality of transaction requests for a plurality of transactions. The at least one risk score may be a plurality of risk scores. Communicating the plurality of risk scores to the service provider system may cause the service provider system to, based at least partially on the plurality of risk scores for the plurality of transactions, prioritize or de-prioritize the plurality of transactions in the resolution queue of the service provider system, which may further cause the service provider system to communicatively connect users and service provider personnel in priority order of transactions in the resolution queue.

Other preferred and non-limiting embodiments or aspects of the present invention will be set forth in the following numbered clauses:

Clause 1: A computer-implemented method for generating location-based risk assessments of service provider transaction requests, the method comprising: receiving, with at least one processor and from a service provider system, at least one transaction request for at least one transaction between at least one user and the service provider system for at least one requested service, the at least one transaction request identifying at least one location for the at least one requested service; generating, with at least one processor, at least one risk score for the at least one transaction based at least partially on the at least one transaction request, the at least one location, and historical transaction data; and communicating, with at least one processor, the at least one risk score for the at least one transaction to the service provider system, wherein communicating the at least one risk score for the at least one transaction to the service provider system causes the service provider system to take at least one of the following actions based at least partially on the at least one risk score for the transaction: (i) display at least one indication including information corresponding to the at least one risk score on at least one mobile device of at least one service provider personnel, (ii) prioritize or de-prioritize the at least one transaction in a resolution queue of the service provider system, (iii) automatically accept or decline the at least one transaction in a transaction handler of the service provider system, or (iv) any combination thereof.

Clause 2: The computer-implemented method of clause 1, wherein generating the at least one risk score comprises: determining, with at least one processor, at least one range of standard transaction times for the at least one location based on the historical transaction data; determining, with at least one processor, that at least one time of the at least one transaction falls within the range of standard transaction times; and, in response to determining that the at least one time of the at least one transaction falls within the at least one range of standard transaction times, reducing the at least one risk score or reducing at least one weighted parameter used to generate the at least one risk score.

Clause 3: The computer-implemented method of clause 1 or 2, wherein generating the at least one risk score comprises: determining, with at least one processor, that at least one time of the at least one transaction or at least one requested time for the at least one requested service is within at least one predetermined time range of at least one previous transaction; and, in response to determining that the at least one requested time is within the at least one predetermined time range, reducing the at least one risk score or reducing at least one weighted parameter used to generate the at least one risk score.

Clause 4: The computer-implemented method of any of clauses 1-3, wherein the at least one requested service comprises transportation from the at least one location to at least one destination, and wherein generating the at least one risk score comprises: determining, with at least one processor, at least one distance between the at least one location and the at least one destination; determining, with at least one processor, that the at least one distance satisfies at least one distance threshold; and, in response to determining that the at least one distance satisfies the at least one distance threshold, increasing the at least one risk score or increasing at least one weighted parameter used to generate the at least one risk score.

Clause 5: The computer-implemented method of any of clauses 1-4, wherein the at least one transaction request comprises at least one transaction value, at least one transaction time, the at least one location, and historical service request data for the at least one user.

Clause 6: The computer-implemented method of any of clauses 1-5, wherein the at least one transaction request comprises at least one transaction authorization request message in an electronic payment processing system, and wherein the at least one risk score is communicated to the service provider system in at least one transaction authorization response message.

Clause 7: The computer-implemented method of any of clauses 1-6, wherein the at least one transaction request is a plurality of transaction requests for a plurality of transactions, wherein the at least one risk score is a plurality of risk scores, and wherein communicating the plurality of risk scores to the service provider system causes the service provider system to, based at least partially on the plurality of risk scores for the plurality of transactions, prioritize or de-prioritize the plurality of transactions in the resolution queue of the service provider system, which further causes the service provider system to communicatively connect users and service provider personnel in priority order of transactions in the resolution queue.

Clause 8: A system for generating location-based risk assessments of service provider transaction requests, the system comprising at least one processor configured or programmed to: receive, from a service provider system, at least one transaction request for at least one transaction between at least one user and the service provider system for at least one requested service, the at least one transaction request identifying at least one location for the requested service; generate at least one risk score for the at least one transaction based at least partially on the at least one transaction request, the at least one location, and historical transaction data; and communicate the at least one risk score for the at least one transaction to the service provider system, wherein communicating the at least one risk score for the at least one transaction to the service provider system causes the service provider system to take at least one of the following actions based at least partially on the at least one risk score for the at least one transaction: (i) display at least one indication including information corresponding to the at least one risk score on at least one mobile device of at least one service provider personnel, (ii) prioritize or de-prioritize the at least one transaction in a resolution queue of the service provider system, (iii) automatically accept or decline the at least one transaction in a transaction handler of the service provider system, or (iv) any combination thereof.

Clause 9: The system of clause 8, wherein generating the at least one risk score comprises: determining, with at least one processor, at least one range of standard transaction times for the at least one location based on the historical transaction data; determining, with at least one processor, that at least one time of the at least one transaction falls within the at least one range of standard transaction times; and, in response to determining that the at least one time of the at least one transaction falls within the at least one range, reducing the at least one risk score or reducing at least one weighted parameter used to generate the at least one risk score.

Clause 10: The system of clause 8 or 9, wherein generating the at least one risk score comprises: determining that at least one time of the at least one transaction or at least one requested time for the at least one requested service is within at least one predetermined time range of at least one previous transaction; and, in response to determining that the at least one requested time is within the at least one predetermined time range, reducing the at least one risk score or reducing at least one weighted parameter used to generate the at least one risk score.

Clause 11: The system of any of clauses 8-10, wherein the at least one requested service comprises transportation from the at least one location to at least one destination, and wherein generating the at least one risk score comprises: determining at least one distance between the at least one location and the at least one destination; determining that the at least one distance satisfies at least one distance threshold; and, in response to determining that the at least one distance satisfies the at least one distance threshold, increasing the at least one risk score or increasing at least one weighted parameter used to generate the at least one risk score.

Clause 12: The system of any of clauses 8-11, wherein the at least one transaction request comprises at least one transaction value, at least one transaction time, the at least one location, and historical service request data for the at least one user.

Clause 13: The system of any of clauses 8-12, wherein the at least one transaction request comprises at least one transaction authorization request message in an electronic payment processing system, and wherein the at least one processor is further configured or programmed to communicate the at least one risk score to the service provider system in at least one transaction authorization response message.

Clause 14: The system of any of clauses 8-13, wherein the at least one transaction request is a plurality of transaction requests for a plurality of transactions, wherein the at least one risk score is a plurality of risk scores, and wherein communicating the plurality of risk scores to the service provider system causes the service provider system to, based at least partially on the plurality of risk scores for the plurality of transactions, prioritize or de-prioritize the plurality of transactions in the resolution queue of the service provider system, which further causes the service provider system to communicatively connect users and service provider personnel in priority order of transactions in the resolution queue.

Clause 15: A computer program product for generating location-based risk assessments of service provider transaction requests, the computer program product comprising at least one non-transitory machine-readable medium comprising instructions, which, when executed by at least one processer, cause the at least one processor to: receive, from a service provider system, at least one transaction request for at least one transaction between at least one user and the service provider system for at least one requested service, the at least one transaction request identifying at least one location for the at least one requested service; generate at least one risk score for the at least one transaction based at least partially on the at least one transaction request, the at least one location, and historical transaction data; and communicate the at least one risk score for the at least one transaction to the service provider system, wherein communicating the at least one risk score for the at least one transaction to the service provider system causes the service provider system to take at least one of the following actions based at least partially on the at least one risk score for the at least one transaction: (i) display at least one indication including information corresponding to the at least one risk score on at least one mobile device of at least one service provider personnel, (ii) prioritize or de-prioritize the at least one transaction in a resolution queue of the service provider system, (iii) automatically accept or decline the at least one transaction in a transaction handler of the service provider system, or (iv) any combination thereof.

Clause 16: The computer program product of clause 15, wherein generating the at least one risk score comprises: determining, with at least one processor, at least one range of standard transaction times for the at least one location based on the historical transaction data; determining, with at least one processor, that at least one time of the at least one transaction falls within the at least one range of standard transaction times; and, in response to determining that the at least one time of the at least one transaction falls within the at least one range, reducing the at least one risk score or reducing at least one weighted parameter used to generate the risk score.

Clause 17: The computer program product of clause 15 or 16, wherein generating the at least one risk score comprises: determining that at least one time of the at least one transaction or at least one requested time for the at least one requested service is within at least one predetermined time range of at least one previous transaction; and, in response to determining that the at least one requested time is within the at least one predetermined time range, reducing the at least one risk score or reducing at least one weighted parameter used to generate the at least one risk score.

Clause 18: The computer program product of any of clauses 15-17, wherein the at least one requested service comprises transportation from the at least one location to at least one destination, and wherein generating the at least one risk score comprises: determining at least one distance between the at least one location and the at least one destination; determining that the at least one distance satisfies at least one distance threshold; and, in response to determining that the at least one distance satisfies the at least one distance threshold, increasing the at least one risk score or increasing a weighted parameter used to generate the at least one risk score.

Clause 19: The computer program product of any of clauses 15-18, wherein the at least one transaction request comprises at least one transaction value, at least one transaction time, the at least one location, and historical service request data for the at least one user.

Clause 20: The computer program product of any of clauses 15-19, wherein the at least one transaction request comprises at least one transaction authorization request message in an electronic payment processing system, and wherein the instructions further cause the at least one processor communicate the at least one risk score to the service provider system in at least one transaction authorization response message.

Clause 21; The computer program product of any of clauses 15-20, wherein the at least one transaction request is a plurality of transaction requests for a plurality of transactions, wherein the at least one risk score is a plurality of risk scores, and wherein communicating the plurality of risk scores to the service provider system causes the service provider system to, based at least partially on the plurality of risk scores for the plurality of transactions, prioritize or de-prioritize the plurality of transactions in the resolution queue of the service provider system, which further causes the service provider system to communicatively connect users and service provider personnel in priority order of transactions in the resolution queue.

These and other features and characteristics of the present invention, as well as the methods of operation and functions of the related elements of structures and the combination of parts and economies of manufacture, will become more apparent upon consideration of the following description, and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular forms of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments that are illustrated in the accompanying figures, in which:

FIGS. 5A-5C depict a flow diagram of one non-limiting embodiment or aspect of a system, method, and computer program product for evaluating location-based risk associated with a remote transaction request.

DETAILED DESCRIPTION OF THE INVENTION

Figure 1:
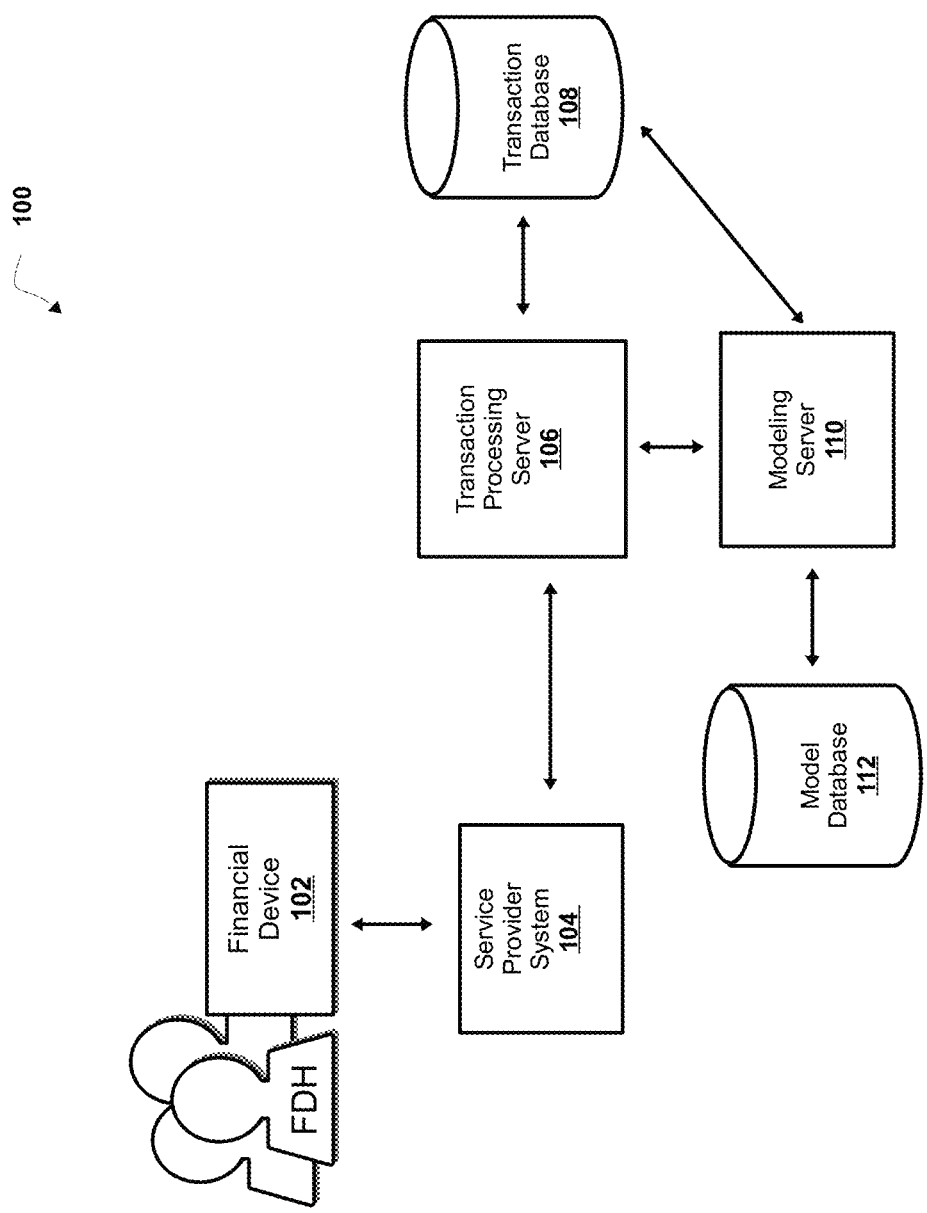
FIG. 1 is a schematic diagram of one non-limiting embodiment or aspect of a system, method, and computer program product for evaluating location-based risk associated with a remote transaction request.

For purposes of the description hereinafter, the terms "upper," "lower," "right," "left," "vertical," "horizontal," "top," "bottom," "lateral," "longitudinal," and derivatives thereof shall relate to the invention as the invention is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting. Also, it should be understood that any numerical range recited herein is intended to include all sub-ranges subsumed therein. For example, a range of 1 to 10 is intended to include all sub-ranges between (and including) the recited minimum value of 1 and the recited maximum value of 10, that is, having a minimum value equal to or greater than 1 and a maximum value of equal to or less than 10.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit.

As used herein, the term "transaction service provider" may refer to an entity that receives transaction authorization requests from merchants or other entities and provides guarantees of payment, in some cases through an agreement between the transaction service provider and an issuer institution. The terms "transaction service provider" and "transaction service provider system" may also refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "issuer institution" may refer to one or more entities, such as a bank, that provide accounts to customers for conducting payment transactions, such as initiating credit and/or debit payments. For example, an issuer institution may provide an account identifier, such as a personal account number (PAN), to a customer that uniquely identifies one or more accounts associated with that customer. The account identifier may be embodied on a physical financial instrument, such as a payment card, and/or may be electronic and used for electronic payments. The terms "issuer institution," "issuer bank," and "issuer system" may also refer to one or more computer systems operated by or on behalf of an issuer institution, such as a server computer executing one or more software applications. For example, an issuer system may include one or more authorization servers for authorizing a payment transaction.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that the tokens can be used to conduct a transaction without directly using the original account identifier. In some examples, an original account identifier, such as a PAN, may be associated with a plurality of tokens for different individuals or purposes. An issuer institution may be associated with a bank identification number (BIN) or other unique identifier that uniquely identifies the issuer institution among other issuer institutions.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. The term "point-of-sale system" or "POS system", as used herein, may refer to one or more computers and/or peripheral devices used by a merchant to engage in payment transactions with customers, including one or more card readers, near-field communication (NFC) receivers, radio-frequency identification (RFID) receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, a POS system, and/or any other device or system capable of communicating with a network.

As used herein, the term "financial device" may refer to a portable payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a mobile device executing an electronic wallet application, a personal digital assistant, a security card, an access card, a wireless terminal, and/or a transponder, as examples. The financial device may include a volatile or a non-volatile memory to store information, such as an account identifier or a name of the account holder. The financial device may store account credentials locally on the device, in digital or non-digital representation, or may facilitate accessing account credentials stored in a medium that is accessible by the financial device in a connected network.

As used herein, the term "server" may refer to or include one or more processors or computers, storage devices, or similar computer arrangements that are operated by or facilitate communication and processing for multiple parties in a network environment, such as the internet. In some non-limiting embodiments, communication may be facilitated over one or more public or private network environments and that various other arrangements are possible. Further, multiple computers, e.g., servers, or other computerized devices, e.g., POS devices, directly or indirectly communicating in the network environment may constitute a system, such as a merchant's POS system. Reference to a server or a processor, as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

The term "account data," as used herein, refers to any data concerning one or more accounts for one or more users. Account data may include, for example, one or more account identifiers, user identifiers, transaction histories, balances, credit limits, issuer institution identifiers, and/or the like.

In non-limiting embodiments or aspects of the present invention, consumer transaction data, both historic and real-time, may be used as a predictive proxy for evaluating the risk of performing a future onsite service for that consumer or for other consumers requesting onsite services in a similar location. It may be presumed that consumers who have completed transactions without incident (e.g., without the service provider being exposed to a personal or economic hazard) multiple times at the same or a similar location will continue to do so in the future. Further, it may be presumed that when many different consumers have completed transactions in a similar location without incident that it is less likely that a service provider will encounter a hazardous condition in that area in the future. In addition, it may be presumed that locations where a large number of card-present transactions take place regularly may be safer than other urban (i.e., highly populated) locations due to the increased presence of onlookers who may be likely to report criminal activity or other unsafe conditions. These premises may be leveraged to train machine-learning models to evaluate the level of location-based risk associated with the delivery of goods and/or the provision of services at one or more locations associated with a remote transaction request based on transaction data for prior transactions previously conducted by consumers in the vicinity of the one or more locations.

In addition, the predicted risk level for a new transaction may be further determined based on one or more external conditions which may be unrelated to the new transaction request, the requestor's past spending behavior, or the spending behavior of others at similar locations. For instance, it may be inferred that consumers may be more likely to request certain types of goods or services (e.g., hired transportation) at an unusual location when certain weather conditions are present, during certain times of day, during certain days of the week, during certain days of the year, or when a special event is occurring in the area. Disclosed systems may receive condition data regarding one or more external conditions from one or more servers (e.g., via the Internet) and such condition data may be further incorporated in order to improve the relevant predictive models.

In non-limiting embodiments or aspects of the present invention, described systems and methods improve over prior art systems by providing a predictive risk evaluation system rather than a reactive risk evaluation system, and may reduce the need to rely on data from outside sources, such as voluntary customer reviews provided by past service providers who have serviced the customers. The described systems and methods may be used as standalone predictive systems, or in combination with other risk evaluation models to augment the efficiency and accuracy of computer-driven risk evaluation systems. Described systems and methods herein use machine-learning models to evaluate the risk of engaging in a new transaction with a consumer based on the consumer's past purchase patterns, as well as those of other consumers at similar locations. This leads to faster and more accurate risk evaluation systems, particularly in situations where there is little or no data available that is specific to the consumer requesting the new transaction in question. For example, in contrast to prior art systems, disclosed systems and methods may, in some non-limiting embodiments, provide at least some measure of risk evaluation even for consumers who have no prior transaction history by leveraging transaction data for transactions that have taken place involving other consumers in similar locations and under similar circumstances. Furthermore, risk calculations are improved by aggregating in real-time the activity of numerous consumers who may be conducting transactions at any given time in a populated geographic region, because a transaction processing server may identify transactions occurring as transaction authorization requests are being processed and leverage the associated transaction data to identify the emergences of new hazardous conditions.

In non-limiting embodiments or aspects of the present invention, described systems and methods further improve over prior art systems by making service provider communication systems more efficient. In service provider systems where multiple transaction requests are received from multiple users for various services over a sample time period, the efficiency of fulfilling those requests may be measured by the number of legitimate requests acted on per unit time. Being able to prioritize fulfilling requests that are more likely legitimate and de-prioritize requests that are more risky is an important improvement for increasing efficiency. Illegitimate service requests, such as due to criminal motivations, fraudulent requests, accidental requests, and/or the like, bog down the service provider system with needless communications and actions on behalf of the service provider system, in addition to other costs associated with acting on illegitimate requests and sending service provider personnel to interact with potentially malfeasant users. For service provider systems with a resolution queue, i.e., a request order for addressing and acting on received service provider transaction requests, proper prioritization of legitimate requests and de-prioritization of risky requests improves interoperability, response time to legitimate requests, and efficiency of expended computer and personnel resources.

With specific reference to FIG. 1, and in non-limiting embodiments or aspects of the present invention, provided is a system 100 for evaluating risk associated with an onsite service request. The system 100 includes one or more financial device holders (FDH), also referred to herein as consumers, customers, or cardholders, that each have one or more financial devices 102, which may be used to complete transactions with merchant point-of-sale (POS) systems, such as a POS system associated with service provider system 104. Each financial device 102 may be associated with a transaction account for settlement of funds to complete transactions with merchants (such as a merchant associated with service provider system 104). Each transaction account may be associated with one or more financial devices 102 and may be associated with one or more financial device holders (FDH), e.g., consumers or customers. The financial device 102 may be used to provide an account identifier for a respective transaction account for the completion of the transaction. Authorization requests for transactions between financial devices 102 and merchant POS systems (e.g., a POS system associated with service provider system 104) are received and processed by a transaction processing server 106, which may be controlled by a transaction service provider, and which may communicate transaction authorization requests to an issuer institution (e.g., the issuer of the financial device to the FDH) and facilitate the completion of a payment transaction. The transaction processing server 106 is communicatively connected to a transaction database 108, to store transaction data associated with the one or more transactions being completed between financial devices 102 and merchant POS systems. Such transaction data may include one or more transaction parameters for each transaction, including, but not limited to: transaction amount, transaction time, transaction date, transaction type, merchant type, transaction location, account identifier, financial device holder identifier, financial device holder place of residence, transaction description, service location, and/or the like.

With further reference to FIG. 1, and in further non-limiting embodiments or aspects of the present invention, the system 100 includes a modeling server 110, which may be the same server as the transaction processing server 106 or which may be communicatively connected to transaction processing server 106 and/or transaction database 108. The modeling server 110 is configured to store and run a machine-learning classification model to generate "standard values" for various transaction parameters for various transaction types (e.g., for transactions for the types of services offered by the service provider associated with service provider system 104) under various conditions based on the stored transaction data (e.g., data stored in transaction database 108) and, optionally, other available data (e.g., data from additional databases or networks associated with the transaction service provider and/or publicly available data obtained from one or more networks such as the Internet).

The "standard value" for a transaction parameter may be representative of an expected value or range of values for the transaction parameter under ambient conditions (e.g., at a particular location, time of day, and day of the week and accounting for known weather conditions and during the occurrence of any presently existing special events (e.g., sporting events, concerts and/or the like)) for a "normal" (e.g., non-fraudulent and low-risk) remote transaction request. The standard values may be based on transaction data of authorization requests processed by a transaction processing server 106, or received from a database of merchant (e.g., a service provider associated with service provider system 104) data that indicates the respective merchant's type of business. In some non-limiting examples, more than one location may be provided with the transaction request (e.g., a start and an endpoint in a request for hired transportation) distance between the start point and the end point (e.g., the road distance and/or the straight line distance) may be also be incorporated in evaluating the risk associated with the transaction request. For example, transaction requests for routes that are unusually short or long in view of the time of day, the location, and/or other surrounding circumstances may be assigned an increased risk score, whereas more typical routes may be assigned a decreased risk score (e.g., as determined by the machine learning classification model).

With further reference to FIG. 1, and in further non-limiting embodiments, the machine-learning classification model may be further trained to generate a risk score for a new transaction request based on a weighted or non-weighted comparison of one or more transaction parameters associated with the new transaction request with the generated standard values for the transaction parameters. In some non-limiting embodiments or aspects, the standard values may be further tailored to an individual consumer (e.g., an FDH associated with financial device 102) based on that consumer's prior transaction history. For example, it may be inferred that when specific types of services have been safely performed for a particular consumer under certain circumstances in the past, it will likely be possible to safely complete similar types of service for the same consumer under similar circumstances in the future. As such, consumers who have a positive transaction history may still be assigned lower risk scores even when engaging in transactions which may be atypical of the general public. Further, it may be inferred that when personal or economic hazards have been encountered when performing specific types of services for an identified consumer in the past, that future transactions involving that consumer may have an increased risk of similar hazards being encountered in the future, even if the transaction would otherwise be typical of other consumers under the relevant circumstances. As such, consumers who have a negative transaction history may be assigned higher risk scores even when engaging in transactions which would otherwise be seen as typical.

With further reference to FIG. 1, and in further non-limiting embodiments, the machine-learning classification model may include any suitable predictive classification model that may be trained on historic transaction to output classifications based on a current transaction data input. For example, the machine-learning classification model may include, but is not limited to: linear classifier models (e.g., logistic regression, naive Bayes classifier, etc.), support vector machine models, decision tree models, boosted tree models, random forest models, neural network models, nearest neighbor models, and/or the like. The modeling server 110 may receive transaction data for model training or classification by communicative connection to the transaction database 108, either directly or indirectly via transaction processing server 106 or another server. Machine-learning classification model data may be stored in a model database 112 that is communicatively connected to the modeling server 110. The model database 112 may be the same database as the transaction database 108. In further non-limiting embodiments, the model may be a reinforcement learning-based solution (e.g., recurrent neural networks, Q-learning, etc.), which may classify consumers' transactions assigning positive/negative reinforcement scores. The results of such a reinforcement-based learning may be stored in the model database 112 categorizing the consumer according to the transaction type, the service location, and the time of service. It will be appreciated that many configurations are possible.

The modeling server 110 may be used to generate, based at least partially on the transaction history of a customer initiating a new service request and/or the transaction histories of other customers who have previously requested services at similar locations (e.g., locations in close proximity to the requested place for service and/or locations that are deemed analogous to the requested place for service), a risk score for the new transaction request. The risk score is representative of a likelihood that a service provider is to experience a personal and/or economic risk in fulfilling the new transaction request and may optionally be further weighted based on the predicted severity of the risk that may be encountered (e.g., risks that involve personal harm may be weighted more heavily that risks that involve mere economic loss). A higher risk score may be considered proportionate to an increased level of risk in completing a new transaction. The estimate of risk may be any quantitative or qualitative value capable of being compared to a predetermined threshold or to the level of risk associated with other potential transactions. In other words, the estimate of risk may be numerical (e.g., a percentile, a score, such as from 0 to 100 or 0 to 1, a likelihood of encountering a hazardous condition expressed as a percentage, and/or the like) or value-related categorical (e.g., low/medium/high, a star rating, a color intensity such as green/yellow/red, and/or the like). A numerical risk estimate may be an absolute value, a score in a range, a rate, a differential, and/or the like, and may be whole numbers, decimals, fractions, or any other quantitative representation.

With further reference to FIG. 1, and in further non-limiting embodiments, the modeling server 110 may compare the estimated risk for fulfilling a new service request to a threshold risk level for the relevant type of service request. The threshold risk level may be based on any parameter or value indicative of an amount of risk above or below which it would be desirable to either expedite the acceptance and/or fulfillment of the new service request or to decline or request additional information or consideration before determining whether to accept the new service request. For example, the threshold of risk level may be a lower bound where, when the level of risk falls below the threshold level, it is determined that it would be desirable to prioritize the service request, and/or to offer particular consumer incentives in connection with the service request in order to encourage further requests for service from that customer under similar circumstances. Alternatively, the threshold risk level may be an upper bound where, when the level of risk exceeds the threshold level, it would be desirable to take protective action, for example, to decline the request, to de-prioritize the request, to contact the potential consumer in order to obtain additional assurances or consideration, or to reassign the request to an affiliated service provider who is equipped to deal with increased risk transactions (e.g., an affiliate who may travel with an armed escort or who may have additional transaction security protocols in place). Multiple thresholds may be employed in combination for the same service request or transaction.

In some non-limiting embodiments, risk estimate and threshold determination steps may be carried out by the modeling server 110 or another server in communication with the system 100. Data regarding service requests that have been fulfilled without incident as well as service requests where hazards were encountered during the course of performance may be periodically stored in a database, such as transaction database 108 or model database 112, and may be used in the future for determining state transitions. In some non-limiting embodiments, a state-based transition system (e.g., a Markov decision engine) may be used to predict the likelihood of risk evolution in the network, according to the historic stored data. The data for such state-based transition may be obtained from the transaction database 108, the model database 112, or any combination thereof, or from another database or network in communication with the system 100. It will be appreciated that many configurations are possible.

With further reference to FIG. 1, and in further non-limiting embodiments, the risk score or data representative thereof or corresponding thereto (which may also be considered a "risk score") may be communicated to the service provider system 104, for example, by transaction processing server 106 during the authorization of a new transaction. Service provider system 104 may be configured to take one or more actions in response to a determination that a risk score has satisfied one or more thresholds. Such actions may include automatically accepting, prioritizing, de-prioritizing, or declining a new transaction request and/or providing a service provider with an indication of a level of risk associated with the new transaction request in order to facilitate informed decision making. For example, service provider system 104 may include a server that communicates to one or more of its agents, employees, or affiliates information or instructions regarding the new transaction request (e.g., by causing an indication to be displayed on a mobile device in possession of one or more of these individuals) based on a predicted level of risk associated with the new transaction request.

Figure 2:
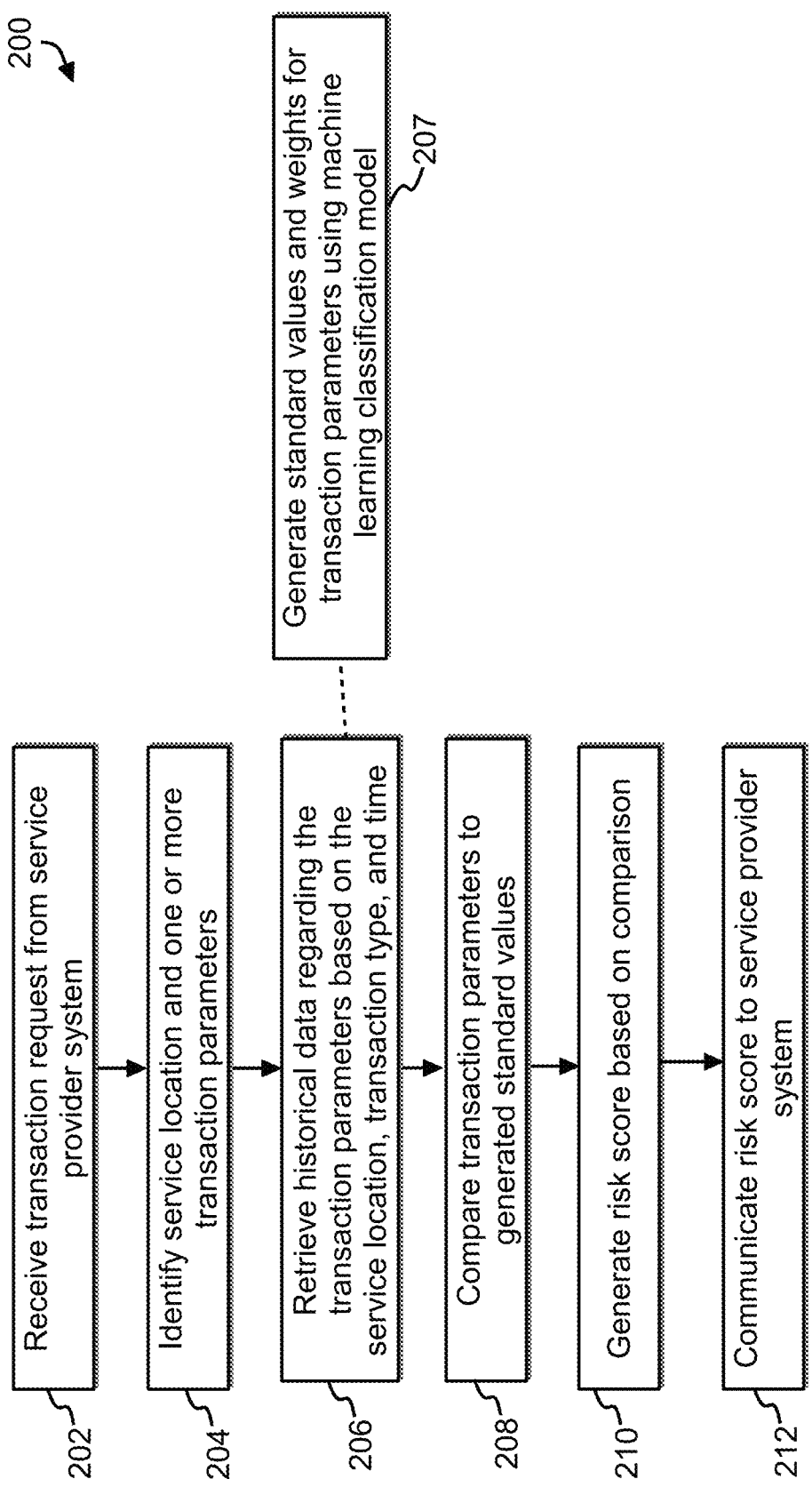
FIG. 2 is a flow diagram of one non-limiting embodiment or aspect of a system, method, and computer program product for evaluating location-based risk associated with a remote transaction request.

With specific reference to FIG. 2, and in non-limiting embodiments or aspects of the present invention, provided is a method 200 for evaluating location-based risk associated with a remote transaction request. The method 200 may be executed by one or more servers, each comprising one or more computer processors. Data that is communicated with the one or more servers may be stored in one or more databases that are communicatively connected to the one or more servers. The method 200 includes, in step 202, receiving a transaction request from a service provider system. In step 204, the service location (or locations) for fulfilling the transaction request and one or more transaction parameters are identified based on the data contained in the transaction request and/or other available data (e.g., the consumer address associated with a financial device involved in the transaction or the location of a merchant with which the financial device has recently completed a card-present transaction). The transaction parameters that are identified for evaluation may be selected based on those which have been previously determined to be germane for evaluating the risk associated with the type of service requested or which are otherwise suitable for comparison to analogous transactions.

In step 206, historical data regarding the identified transaction parameters is retrieved based on the transaction location, transaction type, and time. In accordance with this non-limiting embodiment or aspect, the term "historical data" may include transaction data for transactions between consumers and merchants completed prior to and including up to the moment of receiving the new transaction request. In some non-limiting embodiments, the historic transaction data may specifically include a subset of transactions for the consumer initiating the new transaction request and/or a subset of transactions which involve transactions associated with deliveries and/or services being provided in the vicinity of (e.g., within a threshold distance of) the location for the requested service and/or delivery. In step 207, using a machine learning classification model, standard values are generated for each of the selected transaction parameters based at least partially on the historical data. The standard value for a transaction parameter may be representative of an expected value or range of values for the transaction parameter under ambient conditions (e.g., at a particular location, time of day, day of the week, accounting for known weather conditions, and the occurrence of special events (e.g., sporting events, concerts, and/or the like)) for a "normal" (e.g., non-fraudulent and low-risk) transaction request. In some non-limiting embodiments or aspects, the standard values may be further tailored to an individual consumer based on that consumer's prior transaction history. In addition, each transaction parameter may be weighted with regard to its importance in determining the risk associated with the transaction, for example, based on historical data, user inputted data, other available data, and/or as determined by the machine-learning classification model.

With continued reference to FIG. 2, method 200 includes, at step 208, comparing the transaction parameters for the new transaction request to the generated standard values, and, at step 210, generating a risk score based on this comparison. The risk score is representative of a likelihood that a service provider is to experience a personal and/or economic risk in fulfilling the transaction request and may optionally be further weighted based on the predicted severity of the risk that may be encountered. At step 212, the risk score is communicated to the service provider system, which may take one or more actions based thereon, such as automatically accepting, prioritizing, de-prioritizing, or declining the new transaction request and/or providing a service provider agent, employee, or affiliate with an indication of a level of risk associated with a proposed new service request in order to facilitate informed decision making (e.g., by causing an indication to be displayed on a mobile device in the possession of one or more of these individuals).

Figure 3:
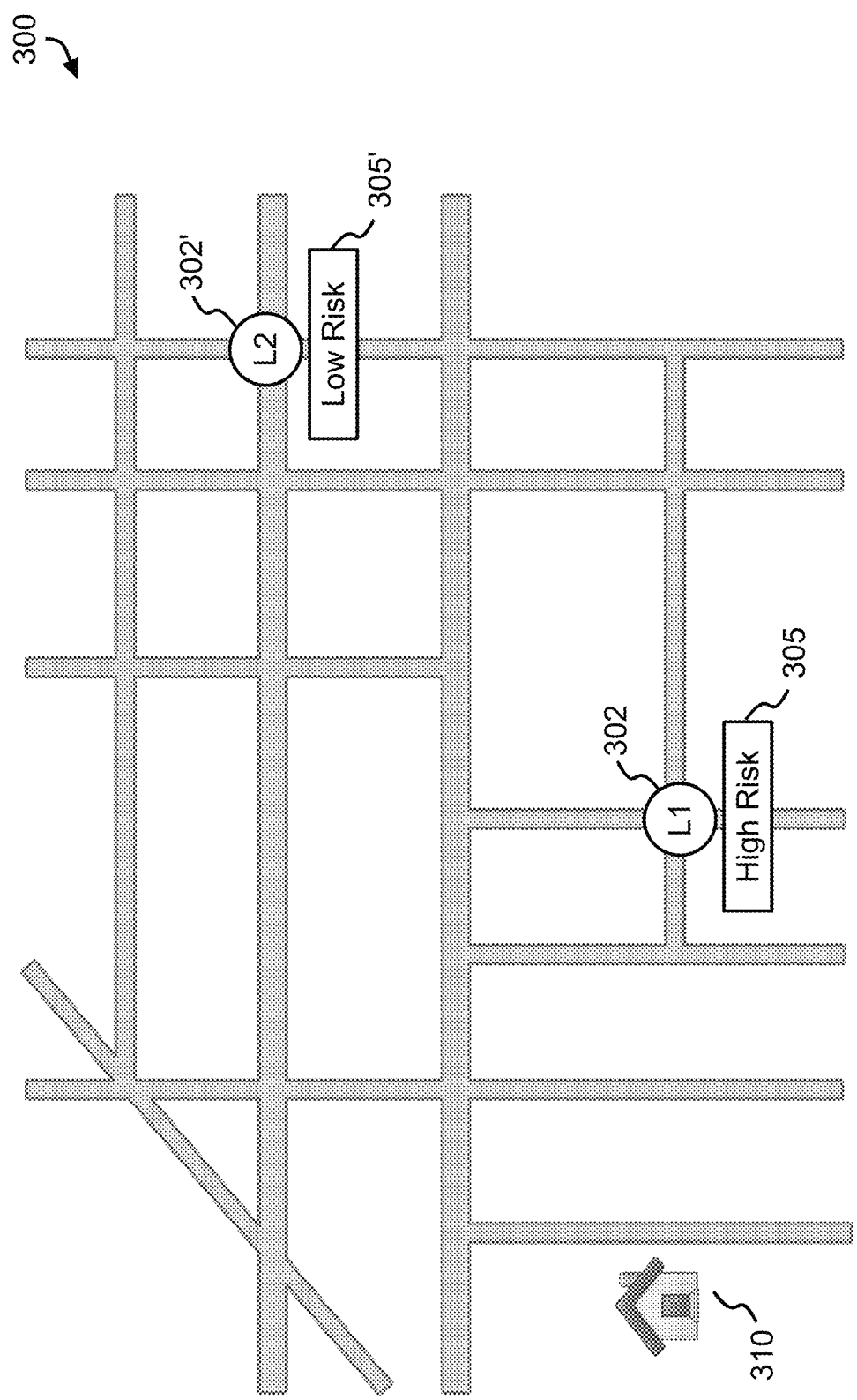
FIG. 3 is an illustrative diagram of one non-limiting embodiment or aspect of a system, method, and computer program product for evaluating location-based risk associated with a remote transaction request.

With specific reference to FIG. 3, and in non-limiting embodiments or aspects of the present invention, provided is an illustrative diagram of a system and method for evaluating location-based risk associated with a remote transaction request. Depicted is a geographic region 300 where a service provider 310 is accepting service requests. For purposes of illustration, in this non-limiting example, the service provider 310 may be a restaurant which takes orders for food delivery. In the example shown, the service provider 310 has received two requests for delivery, one at location L1 (302) and one at location L2 (302'). In accordance with the processes described herein, service provider 310 communicates, via one or more devices, each transaction request to a transaction processing server, with each transaction request including a location for the service to be provided along with other transaction data (e.g., the proposed transaction amount). In some non-limiting embodiments, the transaction data may further include information regarding the goods or services to be provided, however, additionally or alternatively, this information may be determined by the transaction processing server independently, e.g., based on a merchant category code associated with the service provider 310. By way of illustration, in this example, a transaction service provider may determine that the service request is for food delivery based on the merchant category of the service provider 310 (i.e., "restaurant") and the fact that the location data includes a location other than the location of the restaurant. For each transaction request, the transaction processing server (optionally, in conjunction with other servers and/or one or more databases, as described herein) compares historical data for the proposed service and/or delivery location based on the type of goods and/or services requested, the proposed transaction amount, and the time of the requested service or delivery, and uses a machine learning classification model to generate a risk score for each proposed transaction based on a comparison of the various transaction parameters to their expected values as determined based on the historical data (as described in greater detail hereinbefore).

The transaction processing server then communicates the risk score (or data representative thereof) to one or more devices associated with the service provider 310, which may cause the device to automatically display an indication (305, 305') of the estimated level of risk for each of the proposed transactions. In this illustrative example, the request associated with location L1 (302) has been assigned a qualitative indicator 305 indicating that it is a "high risk" request, whereas the request associated with location L2 (302') has been assigned a qualitative indicator 305' indicating that it is a "low risk" request.

Figure 4:
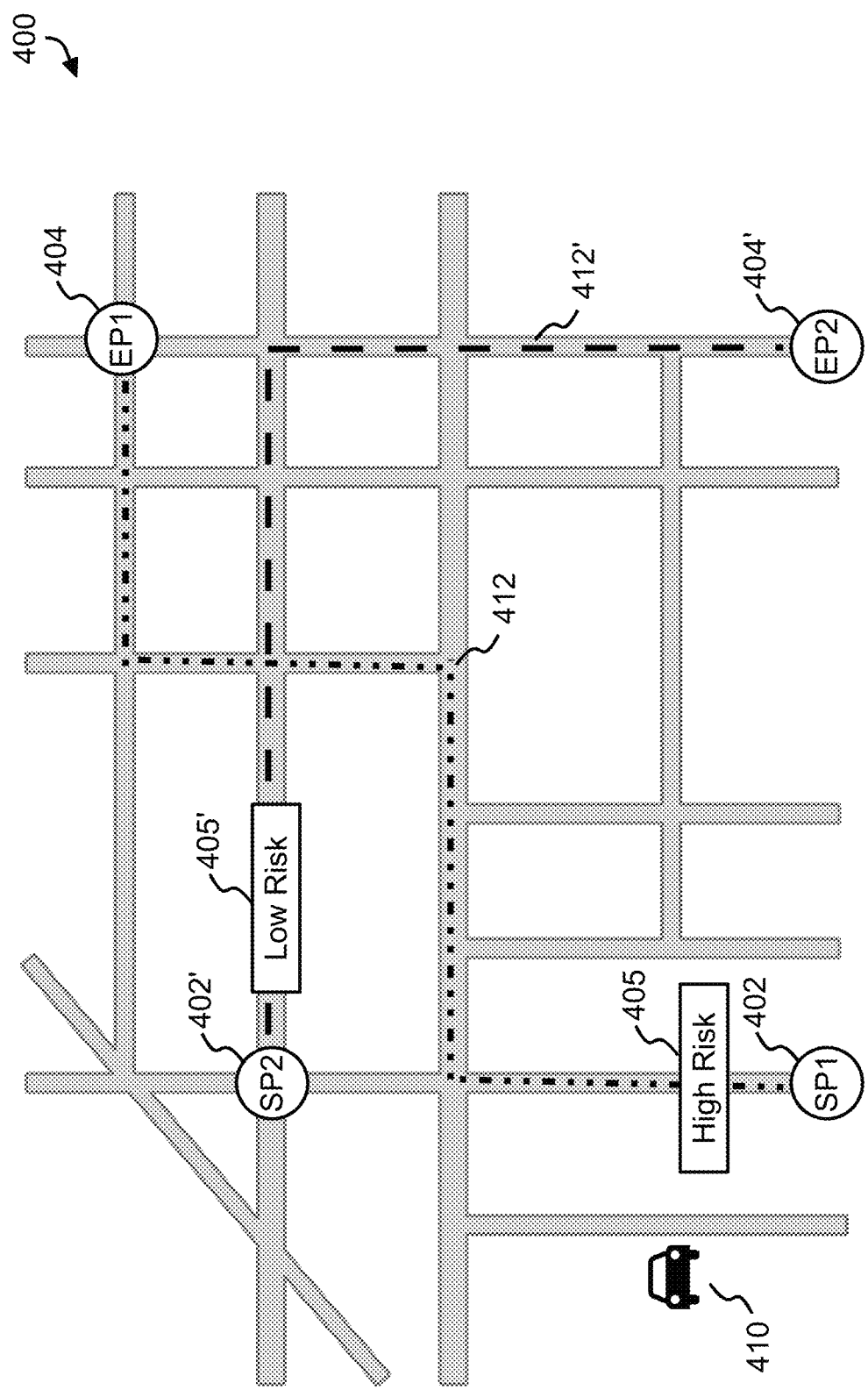
FIG. 4 is an illustrative diagram of one non-limiting embodiment or aspect of a system, method, and computer program product for evaluating location-based risk associated with a remote transaction request.

With specific reference to FIG. 4, and in non-limiting embodiments or aspects of the present invention, provided is an illustrative diagram of a system and method for evaluating location-based risk associated with a remote transaction request. Depicted is a geographic region 400 where a service provider 410 is accepting transaction requests. For purposes of illustration, in this non-limiting example, the service provider 410 may be an operator of a vehicle for hire (e.g., a taxi, a ride-share vehicle, an autonomous vehicle, a bus, a jitney, a pedicab, a carriage, a rickshaw, and/or the like). In the example shown, the service provider 410 has received two requests for pickup, one at location SP1 (402) and one at location SP2 (402'). In accordance with the processes described herein, service provider 410 communicates, via one or more devices, each transaction request to a transaction processing server. In this non-limiting example, each transaction request includes both a start point (SP1 (402), SP2 (402')) and an end point (EP1 (404), EP2 (404')). As discussed previously, in some non-limiting embodiments, the transaction request may further include information regarding the services to be provided, however, additionally or alternatively, this information may be determined by the transaction processing server independently based on a merchant category code associated with the service provider 410.

For example, in this case, transaction service provider may determine that the service request is for transportation based on the merchant category of the service provider 410 (i.e., "vehicle for hire") and the fact that the location data includes a start point and an end point. For each transaction request, the transaction processing server (optionally, in conjunction with other servers and/or one or more databases, as described herein) compares historical data for the proposed service location based on the type of services requested, the proposed transaction amount, and the time of the requested service, and uses a machine learning classification model to generate a risk score for each proposed transaction based on a comparison of the various transaction parameters to their expected values as determined based on the historical data. In one non-limiting example, the transaction processing server may generate a risk score in accordance with the process described herein, for example, hereinafter with regard to FIGS. 5A-5C. The transaction processing server then communicates the risk score (or data representative thereof) to one or more devices associated with the service provider 410, which may cause the device to automatically display an indication (405, 405') of the estimated level of risk for each of the proposed transaction routes (412, 412'). In this illustrative example, the request associated with the route 412 between SP1 (402) and EP1 (404) has been assigned a qualitative indicator 405 indicating that it is a "high risk" request, whereas the request associated with the route 412' between SP2 (402') and EP2 (404') has been assigned a qualitative indicator 405' indicating that it is a "low risk" request. In some non-limiting examples, one or more devices associated with the service provider may take one or more additional actions, such as displaying a warning or requiring the vehicle operator to seek authorization before accepting a high risk transaction request and/or causing a navigation system to automatically direct the vehicle operator to the pick-up location to the lowest risk transaction in the geographic region 400.

Figure 5A:
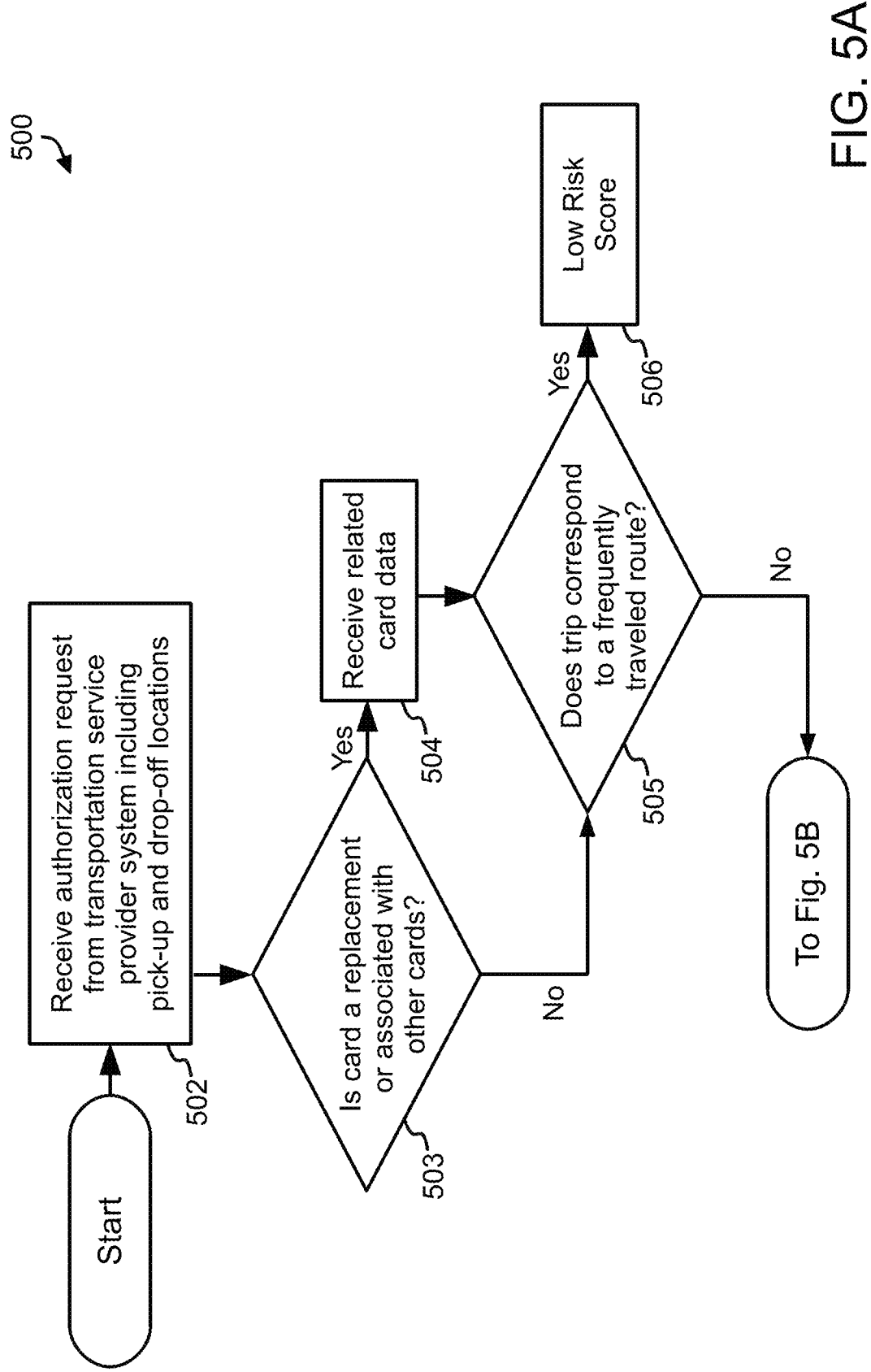
Figure 5C:
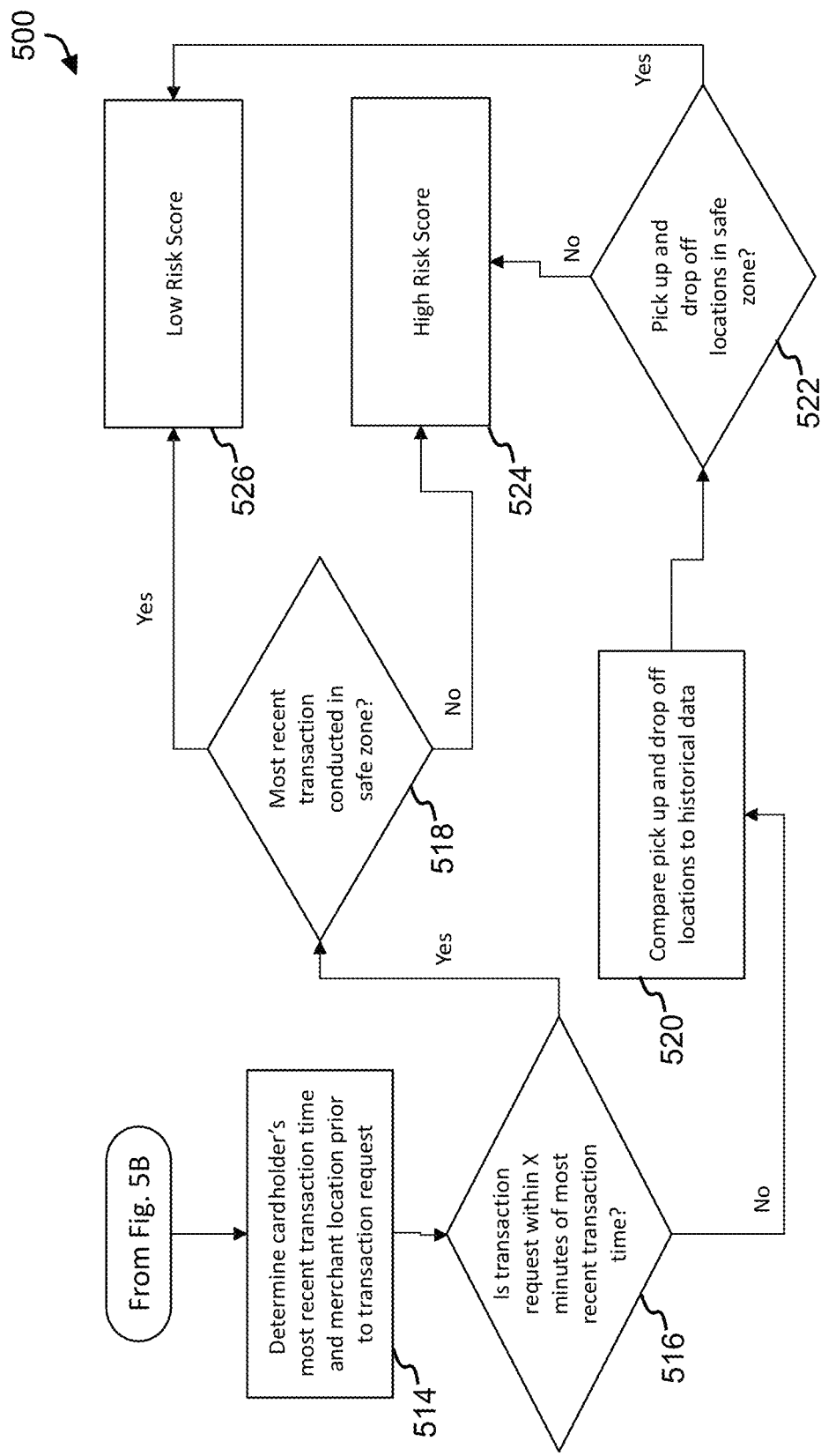

With specific reference to FIGS. 5A-5C, and in non-limiting embodiments or aspects of the present invention, provided is a flow diagram of a system and method for evaluating location-based risk associated with a remote transaction request. In the non-limiting embodiment shown, method 500 may be executed by one or more devices, servers, or systems associated with a transaction service provider. In this non-limiting example, method 500 includes, at step 502, receiving an authorization request from a transportation service provider system, which includes a pickup and drop off location, along with account data associated with a cardholder (i.e., a consumer). The method 500 may further include, at step 503, determining whether the card associated with the authorization request corresponds to other cards, such as a replacement to other, historic cards, as being related to other cards within a wallet/household, and/or the like. If any of these scenarios applies, the method 500 may include, at step 504, receiving card data of those related/corresponding cards for use in subsequent steps in analyzing the current card being used. In one non-limiting use case example, a user may be a frequent traveler of a particular route, but he may have misplaced his card. He receives a new card as replacement after the old card is reported to the issuer as missing. Once the user begins using the new card, there would be little-to-no historic use data, and the system might raise a false alarm (e.g., indicating high risk). However, by determining that the new card corresponds as a replacement to the old card, the system can import the historic use data of the old card to make more accurate determinations. In another non-limiting use case example, a husband and wife might each have a card and go out to dinner. The husband might pay the bill at the restaurant using his card, and the wife might use her card to request a cab for a drop off. Noting that the two cards are related, by way of a household link, the system can calculate a better predictive score when evaluating both card histories together.

At step 505, the transaction service provider system evaluates whether the requested route is a "frequently traveled route," for example, based on historical transaction data. For example, if the same consumer has completed greater than a threshold number (e.g., a predetermined threshold and/or a threshold determined contemporaneously by a machine learning classification model) of successful transactions for hired transportation (e.g., without the vehicle operator encountering a hazard or incident) between the same, similar (e.g., within a threshold distance from), and/or analogous (e.g., between similar types of locations such as between an airport and a hotel or between a restaurant and a residence and/or the like) start and end points in the past, the system may designate the requested route as a frequently traveled route. Additionally or alternatively, if many consumers (e.g., greater than a threshold number of consumers) have requested hired transportation between the same, similar, and/or analogous start and end points in the past, the system may designate the requested route as a frequently traveled route. Upon determining that a requested route or trip corresponds to a frequently traveled route, in this non-limiting example, method 500 includes, at step 506, designating the transaction as a low risk transaction and assigning a low risk score without engaging in further analysis (and thus conserving the network and/or computer processing resources associated with the further steps describe with regard to FIGS. 5B-C).

With specific reference to FIG. 5B, if the proposed trip or route is determined as not corresponding to a frequently traveled route, in this non-limiting example, method 500 includes, at step 508, determining whether the requested trip is within the cardholder's country of residence (e.g., as determined by the transaction service provider based on the consumer's account information). At step 510, upon determining that the proposed trip occurs outside of the cardholder's country of residence, the transaction service provider system determines whether a travel notification has been placed on the card (e.g., by scanning one or more databases associated with the transaction service provider itself or the card issuer and/or one or more publicly available databases (e.g., via the Internet)). If no travel notification has been found for the card, in this non-limiting example, method 500 includes, at step 512, assigning the transaction a high risk score, without engaging in further analysis (and thus conserving the network and/or computer processing resources associated with the further steps described with regard to FIG. 5C).

With specific reference to FIG. 5C, if the trip is determined to occur within the cardholder's country of residence or if a travel notification has been placed on the card, in this non-limiting example, method 500 includes, at step 514, determining the time and location of the cardholder's most recent card-present transaction and the associated merchant location. At step 516, in this non-limiting example, if the cardholder's most recent card-present transaction has occurred within a threshold time period (e.g., a time period which would be indicative that the cardholder is likely to still be within the vicinity of that merchant, which may be predetermined and/or determined by a machine learning classification model), the merchant location for the cardholder's most recent card-present transaction may be used as a predictive proxy for the current location of the cardholder. At step 518, in this non-limiting example, the merchant location (which is being used as a proxy for the consumer's location) may be compared to historical data to determine whether this location is in an identified "safe zone" (e.g., a geographic area where than fewer than a threshold number of hazardous incidents have occurred during a designated time period). If the merchant location is determined to be in a "safe zone", then, at step 526, the request may be assigned a low risk score. Conversely, if the merchant is determined to be outside of a designated safe zone, then, at step 524, the transaction may be assigned a high risk score. In this way, by using a merchant location as a predictive proxy for the location of the user, the network and computer processing resources which would otherwise be used as part of processing the transaction request to identify a precise pickup location of the user and to determine whether that specific location is in a safe zone may be conserved, because the predicted location of the user may be obtained from merchant location data (which is generally already accessible by the transaction processing server) and because whether that location is in a designated safe zone may be predetermined.

With continued to reference to FIG. 5C, if, at step 516, no prior card-present transaction for the cardholder can be identified which is sufficiently recent to be used as a proxy for the cardholder's location (e.g., the most recent card-present transaction for that cardholder occurred more than a threshold amount of time prior to the service request being initiated), in this non-limiting example, method 500 includes, at step 520, comparing pickup and drop off locations received as part of the transaction request to historical transaction data (e.g., using a machine learning classification model). At step 522, if both of the pickup and drop off locations are determined to be in safe zones, at step 526, the service request is assigned a low risk score. Conversely, if, however, one or both of the pickup and drop off locations is determined to be outside of a safe zone, the service request is assigned a high risk score. In this way, in accordance with a non-limiting embodiment or aspect of the present invention, method 500 allows for the identification of location-related risks related to a new transaction request to be identified and communicated to a device associated with a service provider such that the network and computer processing resources required to process the individual locations and destinations of consumers requesting new transactions only in circumstances when other predictive condition data is absent or the new transaction request does not satisfy the requisite conditions for otherwise assigning a risk score. As such, the overall speed and efficiency of the risk evaluation system is improved while still allowing for evaluating the risk associated with new remote transaction requests that do not neatly fit with pre-established risk criteria.

Although the invention has been described in detail for the purpose of illustration based on what is currently considered to be the most practical and preferred and non-limiting embodiments, it is to be understood that such detail is solely for that purpose and that the invention is not limited to the disclosed embodiments but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A computer-implemented method for generating location-based risk assessments of service provider transaction requests, the method comprising:
   receiving, with at least one processor and from a service provider system, a plurality of transaction requests for a plurality of transactions between the service provider system and a plurality of users for at least one requested service, each transaction request of the plurality of transaction requests identifying one requested service associated with a route having a starting location and an ending location;
   generating, with at least one processor, at least one risk score for each transaction request of the plurality of transactions based at least partially on the transaction request, the route associated with the transaction request, and historical transaction data, wherein generating the at least one risk score for each transaction request comprises processing the transaction request and the route associated with the transaction request with at least one machine-learning model configured to generate the at least one risk score, the at least one machine-learning model based on historical transaction data, the at least one machine-learning model trained to generate the at least one risk score based on a weighted comparison of at least one transaction parameter of the transaction request to a value, and wherein the at least one transaction parameter is weighted based on a transaction history of the user; and
   communicating, with at least one processor, the at least one risk score for each transaction request of the plurality of transactions to the service provider system, wherein each transaction request comprises at least one transaction authorization request message in an electronic payment processing system, and wherein the at least one risk score is communicated to the service provider system in at least one transaction authorization response message,
   wherein communicating the at least one risk score for each transaction request of the plurality of transaction requests to the service provider system causes the service provider system to:
      de-prioritize at least one transaction request of the plurality of transactions in a resolution queue of the service provider system based at least partially on the at least one risk score for the at least one transaction request satisfying a threshold ; and
      display, on a mobile device associated with personnel of a service provider associated with the service provider system and based on the resolution queue, a plurality of routes simultaneously on an image of a geographic region based on the resolution queue, each route of the plurality of routes comprising a display of a starting location, an ending location, and a line connecting the starting location with the ending location, wherein a first line for a first route of the plurality of routes appears visually distinct from a second line for a second route of the plurality of routes, and wherein each route of the plurality of routes comprises at least one indication of an estimated risk for each route of the plurality of routes associated with the plurality of transaction requests based on the at least one risk score for the transaction request associated with each route of the plurality of routes.

2. The computer-implemented method of claim 1, wherein generating the at least one risk score comprises:
   determining, with at least one processor, at least one range of standard transaction times for the route based on the historical transaction data;
   determining, with at least one processor, that at least one time of at least one transaction falls within the range of standard transaction times; and
   in response to determining that the at least one time of the at least one transaction falls within the at least one range of standard transaction times, reducing the at least one risk score or reducing at least one weighted parameter used to generate the at least one risk score.

3. The computer-implemented method of claim 1, wherein generating the at least one risk score comprises:
   determining, with at least one processor, that at least one time of at least one transaction or at least one requested time for the at least one requested service is within at least one predetermined time range of at least one previous transaction; and
   in response to determining that the at least one requested time is within the at least one predetermined time range, reducing the at least one risk score or reducing at least one weighted parameter used to generate the at least one risk score.

4. The computer-implemented method of claim 1, wherein generating the at least one risk score comprises:

determining, with at least one processor, at least one distance between the starting location and the ending location;

determining, with at least one processor, that the at least one distance satisfies at least one distance threshold; and in response to determining that the at least one distance satisfies the at least one distance threshold, increasing the at least one risk score or increasing at least one weighted parameter used to generate the at least one risk score.

5. The computer-implemented method of claim 1, wherein the at least one transaction request of the plurality of transaction requests comprises at least one transaction value, at least one transaction time, the route, and historical service request data for at least one user of the plurality of users.

6. A system for generating location-based risk assessments of service provider transaction requests, the system comprising at least one processor configured or programmed to:

receive, from a service provider system, a plurality of transaction requests for a plurality of transactions between the service provider system and a plurality of users for at least one requested service, each transaction request of the plurality of transaction requests identifying one requested service associated with a route having a starting location and an ending location;

generate at least one risk score for each transaction request of the plurality of transactions based at least partially on the transaction request, the route associated with the transaction request, and historical transaction data, wherein the at least one risk score is generated for each transaction request by processing the transaction request and the route associated with the transaction request with at least one machine-learning model configured to generate the at least one risk score, the at least one machine-learning model based on historical transaction data, the at least one machine-learning model trained to generate the at least one risk score based on a weighted comparison of at least one transaction parameter of the transaction request to a value, and wherein the at least one transaction parameter is weighted based on a transaction history of the user; and communicate the at least one risk score for each transaction request of the plurality of transactions to the service provider system, wherein each transaction request comprises at least one transaction authorization request message in an electronic payment processing system, and wherein the at least one risk score is communicated to the service provider system in at least one transaction authorization response message, wherein communicating the at least one risk score for each transaction request of the plurality of transaction requests to the service provider system causes the service provider system to:

de-prioritize at least one transaction request of the plurality of transaction requests in a resolution queue of the service provider system based at least partially on the at least one risk score for the at least one transaction request satisfying a threshold; and simultaneously display, on a mobile device associated with personnel of a service provider associated with the service provider system, a plurality of routes on an image of a geographic region, the plurality of routes identified based on the resolution queue of priority, each route of the plurality of routes comprising a display of a starting location, an ending location, and a line connecting the starting location with the ending location, wherein a first line for a first route of the plurality of routes appears visually distinct from a second line for a second route of the plurality of routes, and wherein each route of the plurality of routes comprises at least one indication of an estimated risk for each route of a plurality of routes associated with the plurality of transaction requests based on the at least one risk score for the transaction request associated with each route of the plurality of routes, such that a plurality of indications of estimated risks for the plurality of routes are simultaneously displayed on the image of the geographic region on the mobile device.

7. The system of claim 6, wherein generating the at least one risk score comprises:

determining, with at least one processor, at least one range of standard transaction times for the route based on the historical transaction data;

determining, with at least one processor, that at least one time of at least one transaction falls within the at least one range of standard transaction times; and in response to determining that the at least one time of the at least one transaction falls within the at least one range, reducing the at least one risk score or reducing at least one weighted parameter used to generate the at least one risk score.

8. The system of claim 6, wherein generating the at least one risk score comprises:

determining that at least one time of at least one transaction or at least one requested time for the at least one requested service is within at least one predetermined time range of at least one previous transaction; and in response to determining that the at least one requested time is within the at least one predetermined time range, reducing the at least one risk score or reducing at least one weighted parameter used to generate the at least one risk score.

9. The system of claim 6, wherein generating the at least one risk score comprises:

determining at least one distance between the starting location and the ending location;

determining that the at least one distance satisfies at least one distance threshold; and in response to determining that the at least one distance satisfies the at least one distance threshold, increasing the at least one risk score or increasing at least one weighted parameter used to generate the at least one risk score.

10. The system of claim 6, wherein the at least one transaction request of the plurality of transaction requests comprises at least one transaction value, at least one transaction time, the route, and historical service request data for at least one user of the plurality of users.

11. A computer program product for generating location-based risk assessments of service provider transaction requests, the computer program product comprising at least one non-transitory machine-readable medium comprising instructions, which, when executed by at least one processer, cause the at least one processor to:

receive, from a service provider system, a plurality of transaction requests for a plurality of transactions between the service provider system and a plurality of users for at least one requested service, each transaction request of the plurality of transaction requests identifying one requested service associated with a route having a starting location and an ending location;

generate at least one risk score for each transaction request of the plurality of transactions based at least partially on the transaction request, the route associated with the transaction request, and historical transaction data, wherein the at least one risk score is generated for each transaction request by processing the transaction request and the route associated with the transaction request with at least one machine-learning model configured to generate the at least one risk score, the at least one machine-learning model based on historical transaction data, the at least one machine-learning model trained to generate the at least one risk score based on a weighted comparison of at least one transaction parameter of the transaction request to a value, and wherein the at least one transaction parameter is weighted based on a transaction history of the user; and communicate the at least one risk score for each transaction request of the plurality of transactions to the service provider system, wherein each transaction request comprises at least one transaction value, at least one transaction time, the route, and historical service request data for at least one user of the plurality of users, wherein each transaction request comprises at least one transaction authorization request message in an electronic payment processing system, and wherein the instructions further cause the at least one processor communicate the at least one risk score to the service provider system in at least one transaction authorization response message, wherein communicating each transaction request of the plurality of transaction requests to the service provider system causes the service provider system to:
de-prioritize at least one transaction request of the plurality of transaction requests in a resolution queue of the service provider system based at least partially on the at least one risk score for the at least one transaction request satisfying a threshold; and
simultaneously display, on a mobile device associated with personnel of at least one service provider, a plurality of routes on an image of a geographic region, the plurality of routes identified based on the resolution queue, each route of the plurality of routes comprising a display of a starting location, an ending location, and a line connecting the starting location with the ending location, wherein a first line for a first route of the plurality of routes appears visually distinct from a second line for a second route of the plurality of routes, and wherein each route of the plurality of routes comprises at least one indication of an estimated risk for each route of a plurality of routes associated with the plurality of transaction requests based on the at least one risk score for each transaction request associated with each route of the plurality of routes such that a plurality of indications of estimated risks for the plurality of routes are simultaneously displayed on the image of the geographic region on the mobile device.

12. The computer program product of claim 11, wherein generating the at least one risk score comprises:
determining, with at least one processor, at least one range of standard transaction times for the route based on the historical transaction data;
determining, with at least one processor, that at least one time of at least one transaction falls within the at least one range of standard transaction times; and
in response to determining that the at least one time of the at least one transaction falls within the at least one range, reducing the at least one risk score or reducing at least one weighted parameter used to generate the risk score.

13. The computer program product of claim 11, wherein generating the at least one risk score comprises:
determining that at least one time of at least one transaction or at least one requested time for the at least one requested service is within at least one predetermined time range of at least one previous transaction; and
in response to determining that the at least one requested time is within the at least one predetermined time range, reducing the at least one risk score or reducing at least one weighted parameter used to generate the at least one risk score.

14. The computer program product of claim 11, wherein generating the at least one risk score comprises:
determining at least one distance between the starting location and the ending location;
determining that the at least one distance satisfies at least one distance threshold; and
in response to determining that the at least one distance satisfies the at least one distance threshold, increasing the at least one risk score or increasing a weighted parameter used to generate the at least one risk score.

15. The computer-implemented method of claim 1, wherein the at least one machine-learning model is trained to generate the at least one risk score based on comparing at least one transaction parameter of the transaction request to a value generated based on a transaction history of a user corresponding to the transaction request.

\* \* \* \* \*